United States Patent
Gentry (10) Patent No.: US 9,161,190 B2
(45) Date of Patent: Oct. 13, 2015

(54) METHODS, SYSTEMS, AND COMPUTER READABLE MEDIA FOR UNIFYING FIXED AND MOBILE DEVICES VIA THIRD PARTY CALL CONTROL

(71) Applicant: GENBAND US LLC, Frisco, TX (US)

(72) Inventor: William D. Gentry, Raleigh, NC (US)

(73) Assignee: GENBAND US LLC, Plano, TX (US)

( * ) Notice: Subject to any disclaimer, the term of this patent is extended or adjusted under 35 U.S.C. 154(b) by 0 days.

(21) Appl. No.: 13/747,308

(22) Filed: Jan. 22, 2013

(65) Prior Publication Data
US 2013/0137410 A1    May 30, 2013

Related U.S. Application Data

(63) Continuation of application No. 12/950,641, filed on Nov. 19, 2010, now abandoned.

(51) Int. Cl.
*H04M 3/42* (2006.01)
*H04W 4/16* (2009.01)
*H04L 29/06* (2006.01)

(52) U.S. Cl.
CPC .............. *H04W 4/16* (2013.01); *H04L 65/1016* (2013.01); *H04L 65/1063* (2013.01); *H04L 65/1073* (2013.01); *H04M 3/42263* (2013.01); *H04M 2203/1091* (2013.01)

(58) Field of Classification Search
USPC ........................................ 379/211.02, 211.04
See application file for complete search history.

(56) References Cited

U.S. PATENT DOCUMENTS

| | | |
|---|---|---|
| 5,329,578 A | 7/1994 | Brennan et al. |
| 5,434,852 A | 7/1995 | La Porta et al. |
| 6,473,612 B1 | 10/2002 | Cox et al. |
| 6,853,718 B1 | 2/2005 | Bedingfield et al. |
| 7,092,385 B2 | 8/2006 | Gallant et al. |
| 7,106,848 B1 | 9/2006 | Barlow et al. |

(Continued)

FOREIGN PATENT DOCUMENTS

| | | |
|---|---|---|
| EP | 0700227 A2 | 3/1996 |
| WO | 2008030514 A2 | 3/2008 |
| WO | 2008060464 A2 | 5/2008 |

OTHER PUBLICATIONS

Interview Summary for U.S. Appl. No. 11/937,593 (May 23, 2011).

(Continued)

*Primary Examiner* — Oleg Asanbayev
(74) *Attorney, Agent, or Firm* — Fogarty, L.L.C.

(57) ABSTRACT

Methods, systems, and computer readable media for unifying fixed and mobile devices via third party call control (3PCC) are disclosed. The method is performed at a dedicated application server (AS) that supports a third-party call control (3PCC) interface. According to one method, a call addressed to a unified subscriber identifier associated with a terminating subscriber is detected, where the terminating subscriber is associated with two or more terminating endpoints. The call is offered to each of the terminating endpoints by initiating signaling to each of the terminating endpoints using the 3PCC interface. One of the terminating endpoints used to answer the call is detected and the call is redirected to the terminating endpoint used to answer the call. Signaling messages are sent to all of the terminating endpoints other than the terminating endpoint used to answer the call for instructing the terminating endpoints to release resources associated with the offered call.

13 Claims, 8 Drawing Sheets

(56) References Cited

U.S. PATENT DOCUMENTS

| | | | |
|---|---|---|---|
| 7,376,112 B2 | 5/2008 | Liu | |
| 7,738,644 B2 | 6/2010 | Brannick et al. | |
| 8,135,124 B2* | 3/2012 | Ramanathan et al. | ... 379/211.04 |
| 2004/0052350 A1 | 3/2004 | Jaroker | |
| 2005/0063529 A1* | 3/2005 | Meldrum et al. | ........ 379/211.04 |
| 2005/0083948 A1 | 4/2005 | Hiroshima et al. | |
| 2006/0077956 A1 | 4/2006 | Saksena et al. | |
| 2006/0229101 A1 | 10/2006 | LaBauve et al. | |
| 2006/0286984 A1 | 12/2006 | Bonner | |
| 2007/0116234 A1 | 5/2007 | Schneider et al. | |
| 2007/0263609 A1 | 11/2007 | Mitchell | |
| 2007/0263610 A1 | 11/2007 | Mitchell | |
| 2007/0263611 A1 | 11/2007 | Mitchell | |
| 2007/0281680 A1 | 12/2007 | Raju et al. | |
| 2008/0056475 A1 | 3/2008 | Brannick et al. | |
| 2008/0119220 A1 | 5/2008 | Bhatia | |
| 2008/0293383 A1 | 11/2008 | Rastas | |
| 2009/0279683 A1 | 11/2009 | Gisby et al. | |
| 2010/0232586 A1 | 9/2010 | McCullough et al. | |
| 2011/0188410 A1 | 8/2011 | Levin et al. | |

OTHER PUBLICATIONS

Final Office Action for U.S. Appl. No. 11/937,593 (Apr. 18, 2011).
Non-Final Official Action for U.S. Appl. No. 11/937,593 (Nov. 12, 2010).
Notice of Allowance and Fee(s) Due for U.S. Appl. No. 11/899,412 (Jan. 28, 2010).
Communication of European Publication Number and Information on the Application of Article 67(3) EPC for European Patent No. 2137947 (Dec. 2, 2009).
Non-Final Official Action for U.S. Appl. No. 11/899,412 (Aug. 11, 2009).
Communication of European publication Number and information on the application of Article 67(3) EPC for European Patent No. 2067346 (May 13, 2009).
Final Official Action for U.S. Appl. No. 11/899,412 (Mar. 24, 2009).
Interview Summary for U.S. Appl. No. 11/899,412 (Dec. 23, 2008).
Notification of Transmittal of the International Search Report and the Written Opinion of the International Searching Authority, or the Declaration for International Application No. PCT/US07/19436 (Jul. 25, 2008).
Non-Final Official Action for U.S. Appl. No. 11/899,412 (Jul. 22, 2008).
Notification of Transmittal of the International Search Retort and the Written O~inion of the International Searching Authority, or the Declaration for International Application No. PCT/US07/23643 (Mar. 14, 2008).
Camarillo et al, "Update to the Session Initiation Protocol (SIP) Preconditions Framework," RFC 4032, pp. 1-10 (Mar. 2005).
Rosenberg, et al., "Best Current Practices for Third Party Call Control (3pcc) in the Session Initiation Protocol," RFC 3725 (Apr. 2004).
Camarillo et al., "Integration of Resource Management and SIP," RFC 3312, pp. 1-24 (Oct. 2002).
Rosenberg et al., "SIP: Session Initiation Protocol," RFC 3261, pp. 1-269 (Jun. 2002).

* cited by examiner

METHODS, SYSTEMS, AND COMPUTER READABLE MEDIA FOR UNIFYING FIXED AND MOBILE DEVICES VIA THIRD PARTY CALL CONTROL

This application is a continuation of pending U.S. patent application Ser. No. 12/950,641, filed Nov. 19, 2010, the contents of which are hereby incorporated herein by reference in their entirety.

TECHNICAL FIELD

The subject matter described herein relates to communications between fixed and mobile devices. More specifically, the subject matter relates to methods, systems, and computer readable media for unifying fixed and mobile devices via third party call control.

BACKGROUND

As the number of communications devices has increased, and with it the number of network identities associated with individual users, there exists an increased desirability for a single identity that can be used in sessions across all of a user's communication devices, both fixed and mobile, along with a consistent set of voice and multi-media applications that can be leveraged for all devices.

One conventional solution for providing such a single identity in SIP-based pre-IMS networks, as well as 3GPP-based IMS networks, includes having both the fixed and mobile devices register with the same application server. For example, all fixed and mobile clients may be required to register with SIP application servers using the same identity. However, this solution has several drawbacks such as inflexibility in the identities selectable by a user and interoperability difficulties between various types of networks and devices. Additionally, while third party call control interfaces currently exist on PBX and other end office nodes, these interfaces are not currently used to create a single identity for subscribers across both fixed and mobile devices.

Accordingly, in light of these difficulties, a need exists for improved methods, systems, and computer readable media for unifying fixed and mobile devices without excessive use of telephony resources.

SUMMARY

Methods, systems, and computer readable media for unifying fixed and mobile, devices via third party call control (3PCC) are disclosed. The method is performed at a dedicated application server (AS) that supports a third-party call control (3PCC) interface. According to one method, a call addressed to a unified subscriber identifier associated with a terminating subscriber is detected, where the terminating subscriber is associated with two or more terminating endpoints. The call is offered to each of the terminating endpoints by initiating signaling to each of the terminating endpoints using the 3PCC interface. One of the terminating endpoints used to answer the call is detected and the call is redirected to the terminating endpoint used to answer the call. Signaling messages are sent to all of the terminating endpoints other than the terminating endpoint used to answer the call for instructing the terminating endpoints to release resources associated with the offered call.

A system for unifying fixed and mobile devices via third party call control is also disclosed. The system includes a third-party call control (3PCC) interface for detecting a call addressed to a unified subscriber identifier associated with a terminating subscriber, where the terminating subscriber is associated with two or more terminating endpoints. The 3PCC interface is configured to offer the call to each of the terminating endpoints by initiating signaling to each of the terminating endpoints. The 3PCC interface is further configured to detect one of the terminating endpoints used to answer the call. A communications module is configured to redirect the call to the terminating endpoint used to answer the call and to send signaling messages to all of the terminating endpoints other than the terminating endpoint used to answer the call for instructing the terminating endpoints to release resources associated with the offered call.

The subject matter described herein for unifying fixed and mobile devices via third party call control may be implemented using a non-transitory computer readable medium to having stored thereon executable instructions that when executed by the processor of a computer control the processor to perform steps. Exemplary non-transitory computer readable media suitable for implementing the subject matter described herein include chip memory devices or disk memory devices accessible by a processor, programmable logic devices, and application specific integrated circuits. In addition, a computer readable medium that implements the subject matter described herein may be located on a single computing platform or may be distributed across plural computing platforms.

TERMINOLOGY

As used herein, the term "third party call control" or "3PCC" refers to the ability of one entity to create a call/session in which communication is actually between other parties. In the traditional telephony context, third party call control allows one entity (i.e., the controller) to set up and manage a communications relationship or telephone call between two or more other parties. For example, third party call control may be used for operator services (where an operator creates a call that connects two participants together) and call conferencing. Third party call control is possible using the mechanisms specified within the Session Initiation Protocol (SIP) and can include the traditional ones on the PSTN, but also new ones such as click-to-dial and next Generation 9-1-1. Click-to-dial allows a user to click on a web page to speak to a customer service representative. The web server then creates a call between the user and a customer service representative. The call can be between two phones, a phone and an IP host, or two IP hosts. Next Generation 9-1-1 allows for re-connection of a media stream to an alternate end point if the original destination end point becomes unavailable without dropping the original emergency call (which has a separate media stream to the 3PCC server). 3PCC is described in more detail in Ecma technical report (TR)-87, telephony application programming interface (TAPI), telephony server application programming interface (TSAPI), java telephony application programming interface (JTAPI) as well as the following Internet engineering task force (IETF) request for comments (RFCs): RFC 3261—SIP: Session Initiation Protocol, RFC 3312—Integration of Resource Management and Session Initiation Protocol (SIP), RFC 3725—Best Current Practices for Third Party Call Control (3pcc) in the Session Initiation Protocol (SIP), RFC 4032—Update to the Session Initiation Protocol (SIP) Preconditions Framework, which are incorporated by reference herein in their entireties.

As used herein, the term "unified subscriber identity" refers to any type of unique address for a user, such as a directory number (DN). A unified subscriber identity may include an existing address, such as a user's home or work telephone number. A unified subscriber identity may encompass multiple identifiers or addresses associated with a user or device.

As used herein, the term "endpoint" refers to a point of termination (i.e., communications device) for a communications session, such as a landline telephone, SIP phone, mobile phone (cellular or otherwise).

As used herein, the term "fixed" refers to a state of being stationary, attached, established, or stable in terms of physical and/or logical location.

As used herein, the term "mobile" refers to a state of moving, capable of moving, or being moved from one location to another location.

As used herein, the term "node" is a connection point (communications device) in a communications network such as a redistribution point or a communication endpoint. A physical network node, therefore, is an active electronic device that is attached to a network, and is capable of sending, receiving, or forwarding information over a communications channel. In the fixed telephone network, a node may be a public or private telephone exchange, a remote concentrator, or a computer providing an intelligent network service. In cellular communication, switching points and databases such as the Base station controller, Home Location Register, Gateway GPRS Support Node (GGSN), and Serving GPRS Support Node (SGSN) are examples of nodes. Other exemplary nodes may include MSCs, STPs, SCPs, SSRs, and ASs.

As used herein, the term "originate" refers to the process of creating or bringing into being a call or session.

As used herein, the term "terminate" refers to the process of ending or concluding a call or session.

As used herein, the terms "deflect" "deflecting" and "deflection" refer to the process of diverting a call or session from a first destination endpoint to a second destination endpoint before the call or session is answered by the first destination endpoint.

As used herein, the term "transfer" refers to the process of diverting a call or session from a first destination endpoint to a second destination endpoint after the call or session is answered by the first destination endpoint.

As used herein, the term "grab" refers to the process of requesting the diversion or transfer of a call or session from a first destination endpoint to a second destination endpoint.

As used herein, the term "redirect" refers to any of: deflecting, transferring, and grabbing.

As used herein, the term "instruct" refers to signaling or communicating a task to be performed. For example, a first node may instruct a second node by sending one or more messages to the second node.

As used herein, the term "alert" refers to the process of a device performing an action intended to make the user aware of a session (e.g., ringing) when the session is offered to a device associated with the user.

As used herein, the term "page" refers to the process of locating a registered mobile client within the radio access network.

As used herein, the term "service" refers to a set of related software functionality, together with the policies that control its usage. Services may be deployed and used on the Internet (or private IP networks) and may also be accessed from traditional circuit switched networks. Exemplary services include voice over IP (VoIP), IP television (IPTV), presence, instant messaging, and location-based services.

As used herein, the term "registration" refers to a representation of a dynamic piece of state information maintained by the network. A registrar is a server that accepts registrations from users and stores the registrations in a database known as a location service database.

As used herein, the terms "register" and "registering" refer to the process of recording or associating a user with a particular location and/or IP address in a database. Registering allows a user agent to create, modify, and delete registrations.

As used herein, the term "session" refers to a packet stream compatible with the session initiation protocol (SIP). Exemplary packet streams may include real time transport protocol (RTP) packets for carrying voice and/or video content.

BRIEF DESCRIPTION OF THE DRAWINGS

The subject matter described herein will now be explained with reference to the accompanying drawings of which.

DETAILED DESCRIPTION

The subject matter described herein includes methods, systems, and computer readable media for unifying fixed and mobile devices via third party call control. This includes maintaining a single identity across multiple fixed and/or mobile devices including fixed (VoIP or TDM) endpoints that are not registered with a SIP application server. Such endpoints can include endpoints associated with PBX nodes within corporate networks, soft switches which host VoIP and TDM endpoints, and traditional telephony TDM end offices. The subject matter described herein accomplishes this by integrating third-party call control interfaces with offboard application servers to allow the user to leverage a single set of screening/routing services for all devices, extend a session to a mobile, and instruct the node which hosts the fixed device to deflect the call to the application server for final connection establishment. For example, an application server logically sitting above all other network nodes necessary for connecting the various fixed and mobile endpoints that may be associated with the user may be specially dedicated for the purpose of performing unified third party call control. Moreover, users may designate one of their existing subscriber identifiers (e.g., their home telephone number) as their unified subscriber identity used to unify all of their services, where the user's other subscriber identifiers (e.g., SIP URI, email address, work telephone number, etc.) may be associated with the unified subscriber identifier in the dedicated AS. According to other embodiments, the subject matter described herein also provides for an existing session to be grabbed from one device to the other as needed by the subscriber. Specific non-limiting examples of various embodiments will now be described in greater detail below.

System

Figure 1:
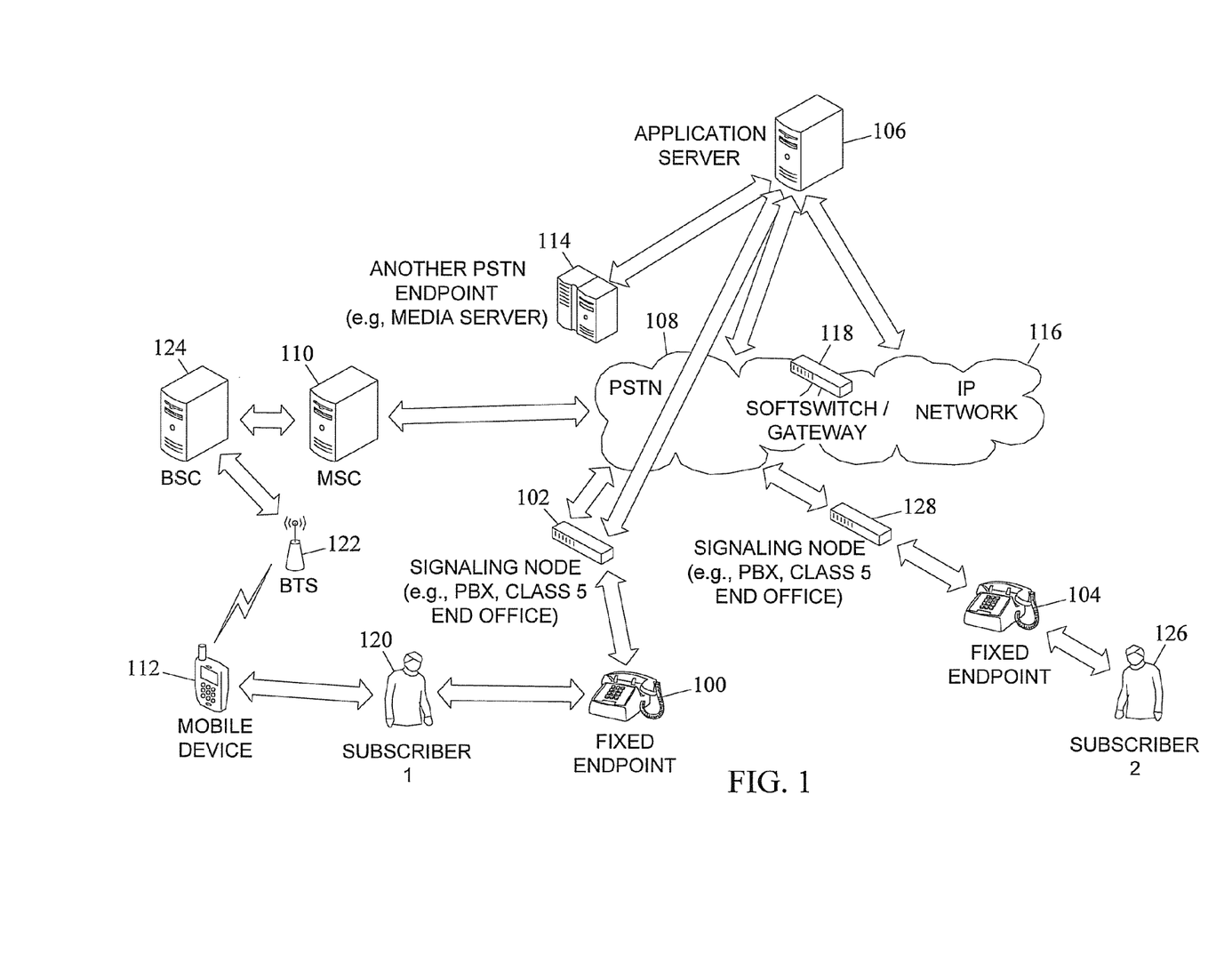
FIG. 1 is a system diagram showing exemplary components for unifying fixed and mobile devices via third party call control according to an embodiment of the subject matter described herein.

FIG. 1 is a system diagram showing exemplary components for unifying fixed and mobile devices via third party call control according to an embodiment of the subject matter described herein. Referring to FIG. 1, fixed endpoint 100 may include a conventional landline telephone and may be associated with a first subscriber. It may be appreciated that fixed endpoint 100 can leverage any one of a variety of access interfaces (e.g., VoIP or TDM-based).

Signaling node 102 may support a third-party call control interface and host fixed endpoint 100. Signaling node 102 may take the form of a public branch exchange (PBX), class 5 end office switch, call server, soft switch, or telephony time division multiplexed (TDM) node. A single identity may be defined (i.e., unified subscriber identity), on signaling node 102 which hosts fixed endpoint 100, for each user from among a plurality of users. This single identity typically takes the form of a directory number (DN), but may include any type of unique address for the user.

Fixed endpoint 104 may be the same as fixed endpoint 100 with the exception that fixed endpoint 104 may be associated with a different subscriber and, therefore, may be served by a different signaling node.

SIP application server 106 is a network communications node that hosts and executes services, and may interface with one or more S-CSCFs using SIP. An application server may be used to provide uniform services across the fixed endpoint and mobile endpoint. The application server leverages the 3PCC interface to register interest in a specific endpoint and receive notifications whenever telephony sessions originate or terminate to the fixed endpoint. The application server may leverage the 3PCC interface to request notification events whenever a session originates or terminates to the fixed endpoint, as well as progress of such sessions.

The 3PCC interface can take any one of several forms, including TR-87 and TAPI-based 3PCC interfaces.

Public switched telephone network (PSTN) 108 is circuit-switched network collection of interconnected public telephone networks that was designed primarily for voice traffic.

Mobile switching center (MSC) 110 is the primary service delivery node for GSM/CDMA and is responsible for routing voice calls and SMS as well as other services. MSC 110 may be responsible for setting up and releasing end-to-end connections, handling mobility and hand-over requirements during calls, and taking care of charging and real time pre-paid account monitoring. It may be appreciated that the subject matter described herein may be applied to both pre-IMS and IMS configurations where the mobile device is accessed via an IMS core network.

Mobile device 112 may include a cellular telephone, smart phone, PDA, or similar mobile communications endpoint. It is appreciated that a single subscriber may be associated with multiple endpoints, such as fixed endpoint 100 (work phone) and mobile device 112 (cell phone).

Media server 114 may refer to a device configured to provide a variety of functions. A media resource function (MRF) may provide media related functions such as media manipulation (e.g. voice stream mixing) and playing of tones and announcements. Each MRF may be further divided into a media resource function controller (MRFC) and a media resource function processor (MRFP). The MRFC may include a signaling plane node that interprets information received from an AS and S-CSCF to control the MRFP. The MRFP may include a media plane node used to mix, source, or process media streams as well as to manage access rights to shared resources. The media resource broker (MRB) may include a functional entity that is responsible for both collection of appropriate published MRF information and supplying of appropriate MRF information to consuming entities such as the AS. The MRB can be used in two modes: query mode and in-line mode. For query mode, the AS may query the MRB for media and, using the response of MRB, may set up the call. For in-line mode, the AS may send a SIP INVITE to the MRB and the MRB may set up the call.

Internet protocol (IP) network 116 is a network that uses the IP protocol, which is part of the TCP/IP protocol suite. This includes the Internet, private LANs, and other packet-switched data and voice networks.

Softswitch/gateway 118 is a central device in a telecommunications network which connects telephone calls from one phone line to another, entirely by means of software running on a computer system. This work was formerly carried out by hardware, with physical switchboards to route the calls. A softswitch is typically used to control connections at the junction point between circuit and packet networks First subscriber 120 may include a user capable of using an endpoint in order to communicate with other users (via other endpoints) in a communications network. It may be appreciated that first subscriber 120 may be associated with a plurality of both mobile and fixed communications devices. For example, first subscriber 120 may be associated with a home landline telephone having a fixed home telephone number, a home cellular phone having a mobile home number, a work VoIP phone having a fixed work number, and a work Blackberry™ having a mobile work number.

Base transceiver station (BTS) 122 facilitates wireless communication between user equipment (UE) and a network. UEs are devices like mobile phones (handsets), WLL phones, computers with wireless Internet connectivity, WiFi and WiMAX gadgets etc. The network can be that of any of the wireless communication technologies like GSM, CDMA, WLL, WAN, WiFi, WiMAX etc. BTS is also referred to as the radio base station (RBS), node B (in 3G Networks) or, simply, the base station (BS).

Base station controller (BSC) 124 handles allocation of radio channels, receives measurements from the mobile phones, and controls handovers from BTS to BTS (except in the case of an inter-BSC handover in which case control is in part the responsibility of the anchor MSC). A single BSC may have tens or even hundreds of BTSs under its control. One function of BSC 124 may be to act as a concentrator where many different low capacity connections to BTSs (with relatively low utilization) become reduced to a smaller number of connections towards the mobile switching center (MSC) (with a high level of utilization). BSC 124 may also provide all the required data to the operation support subsystem (OSS) as well as to the performance measuring centers.

Second subscriber 126 may include a user similar to first subscriber 120 described above. However, it may be appreciated that second subscriber 126 may belong to different (or the same) network(s) as first subscriber 120 and may be associated with different devices and/or subscriber identifiers (e.g., telephone numbers, URIs, etc.)

Terminations to a Unified Subscriber Identity

Figure 2:
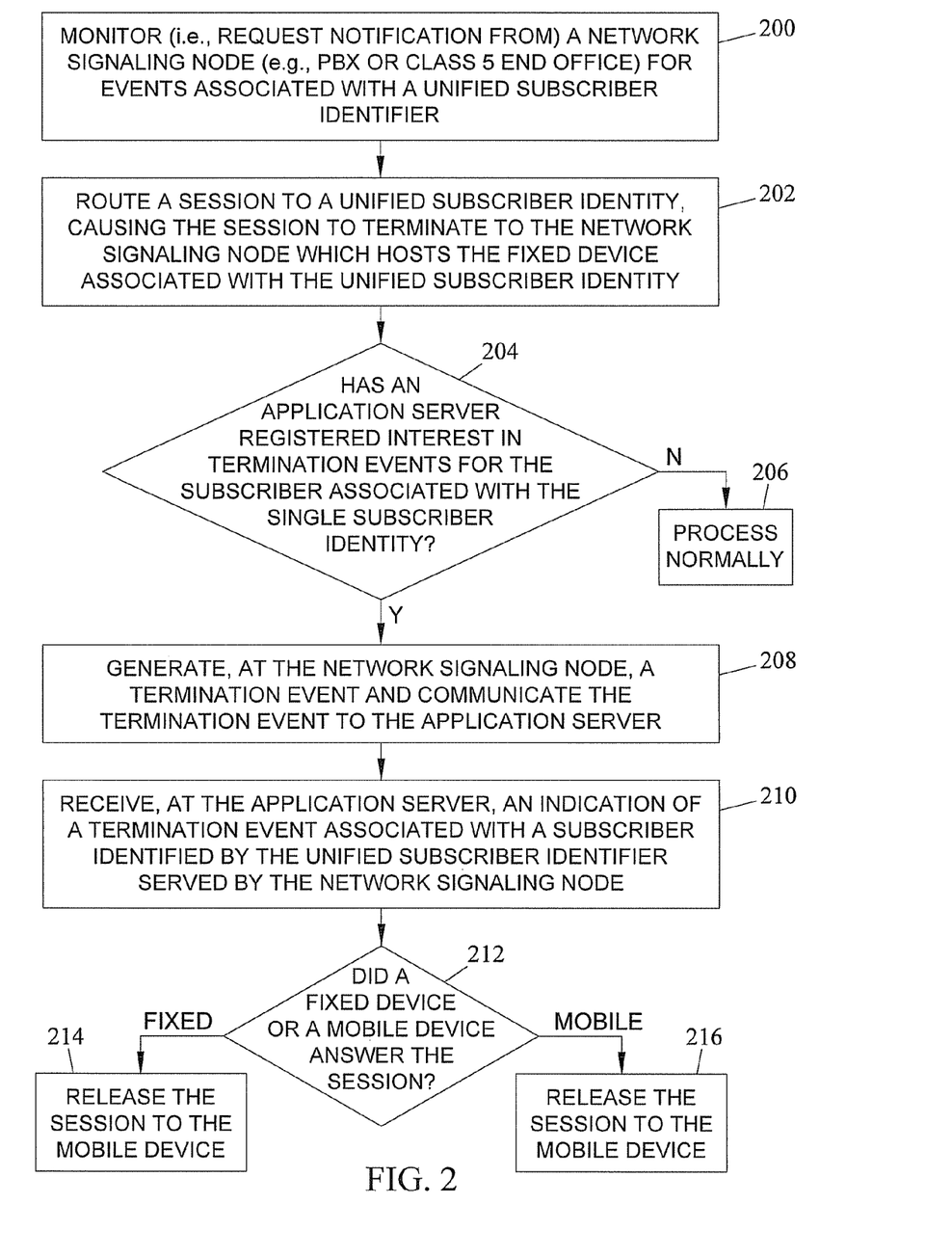
FIG. 2 is a flow chart showing an exemplary process for terminating a session to one of a fixed and a mobile device via unified third party call control according to an embodiment of the subject matter described herein.

FIG. 2 is a flow chart showing an exemplary process for terminating a session between unified fixed and mobile devices via third party call control according to an embodiment of the subject matter described herein. Referring to FIG. 2, at step 200, a network signaling node may be monitored for events associated with a unified subscriber identifier. For example, an application server may request notification of (e.g., subscribe to) events such as reception of a SIP INVITE message associated with some subscriber identifiers served by a signaling node (e.g., a public branch exchange (PBX) or class 5 end office) but not other subscriber identifiers.

At step 202, the session may be routed to a unified subscriber identity, which may cause the session to terminate at the node which hosts the fixed device associated with the unified subscriber identity. For example, originating endpoint may create a session addressed to DN +1-202-533-1234 which is terminated at node 102.

At step 204, signaling node 102 may determine whether an application server has registered to receive notification of (i.e., registered interest in) termination events for the unified subscriber identity. If no application server has registered to receive notification of termination events for the subscriber associated with the session, control may proceed to step 206 where the session may be processed normally. However, if the session is associated with a unified subscriber identifier for which an application server has registered to receive notification of termination events, control may proceed to step 208.

At step 208, using the 3PCC protocol, the signaling node (e.g., PBX or class 5 end office) may generate) a termination event notification which may be communicated to application server 106. At step 210, the notification of the termination event associated with the subscriber identified by the unified subscriber identifier served by signaling node 102 may be received by application server 106. In this example, because application server 106 has registered with node 102 requesting notification of termination events associated with DN +1-202-533-1234, signaling node 102 may send termination event notification to application server 106 indicating that a session addressed to DN +1-202-533-1234 has been received.

At step 212, upon receiving the termination event notification, application server 106 may execute screening and routing logic in order to determine how the session should ultimately terminate and whether it should be forked to multiple destinations. Depending on the capabilities of the 3PCC protocol, application server 106 may proceed to offer the session to the fixed endpoint, or may suspend the session for a short period of time in order to give application server 106 the opportunity to execute services. Unless application server 106 responds otherwise, the session may be offered to the fixed endpoint, and alerting is provided to the fixed endpoint. In one embodiment, application server 106 may create a new call session to the subscriber's mobile endpoint by leveraging the DN of the mobile endpoint. This session may be routed by application server 106 to the wireless network which serves the subscriber's mobile endpoint. Mobile device 112 may be paged and alerted. At this point, both subscriber's fixed endpoint 104 and mobile endpoint 112 are alerting. Application server 106 may also leverage media server 114 to generate comfort noise, tone, or announcement that may eventually be connected to mobile endpoint 112 when it answers. This will alert the subscriber that a call is being delivered to their device during the short interval when the final connection is being negotiated.

At step 214, if the fixed device answers the session, an answer notification may be delivered using a 3PCC protocol interface to application server 106. Upon receiving the answer notification, application server 106 may release the session to the subscriber's mobile device. Signaling messages may be sent to all of the terminating endpoints other than the terminating endpoint used to answer the call for instructing the terminating endpoints to release resources associated with the offered call. For example, fixed endpoint 104 may deliver answer notification message to application server 106 and, in response, application server 106 may send a session Release message to mobile endpoint 112. It may be appreciated that the application server 106 may continue to maintain state information for the active session so that it can be made visible to services running on application server 106 (such as presence-based services).

At step 216, if mobile device 112 answers the session, application server 106 may detect the answer signal and may begin to establish a media connection between fixed endpoint 100 and mobile device 112. It may be appreciated that while this connection is being formed, the subscriber may be connected to comfort tones or announcements generated by media server 114.

Establishment of a media connection may involve application server 106 using the 3PCC interface to instruct signaling node 102 to deflect the session away from fixed endpoint 104 and instead route it to a temporary location DN (TLDN) provided by application server 106. This TLDN may be managed as a pooled resource by application server 106, and may be temporarily associated with the specific session. For example, application server 106 may detect answer signal from mobile endpoint 112 and, in response, send a deflect session message that includes TLDN +1-808-577-9876 to fixed endpoint 104. Node 102 may respond by deflecting the session. The alerting session to fixed endpoint 104 may be released, and the call may be redirected to the TLDN provided by application server 106. The TLDN may be routed through the interconnect network to application server 106. The interconnect network can take any one of a variety of forms, including for example public switched telephone network (PSTN) 108 or a private network. When the redirected call arrives at application server 106, the TLDN may be used to correlate it to the session that was previously created for mobile device 112. Application server 106 may then negotiate an end-to-end media path between fixed endpoints 100 and 104. The state of the active session may be maintained by application server 106 and may be represented to other services running on the server (e.g., presence-based services).

Figure 3:
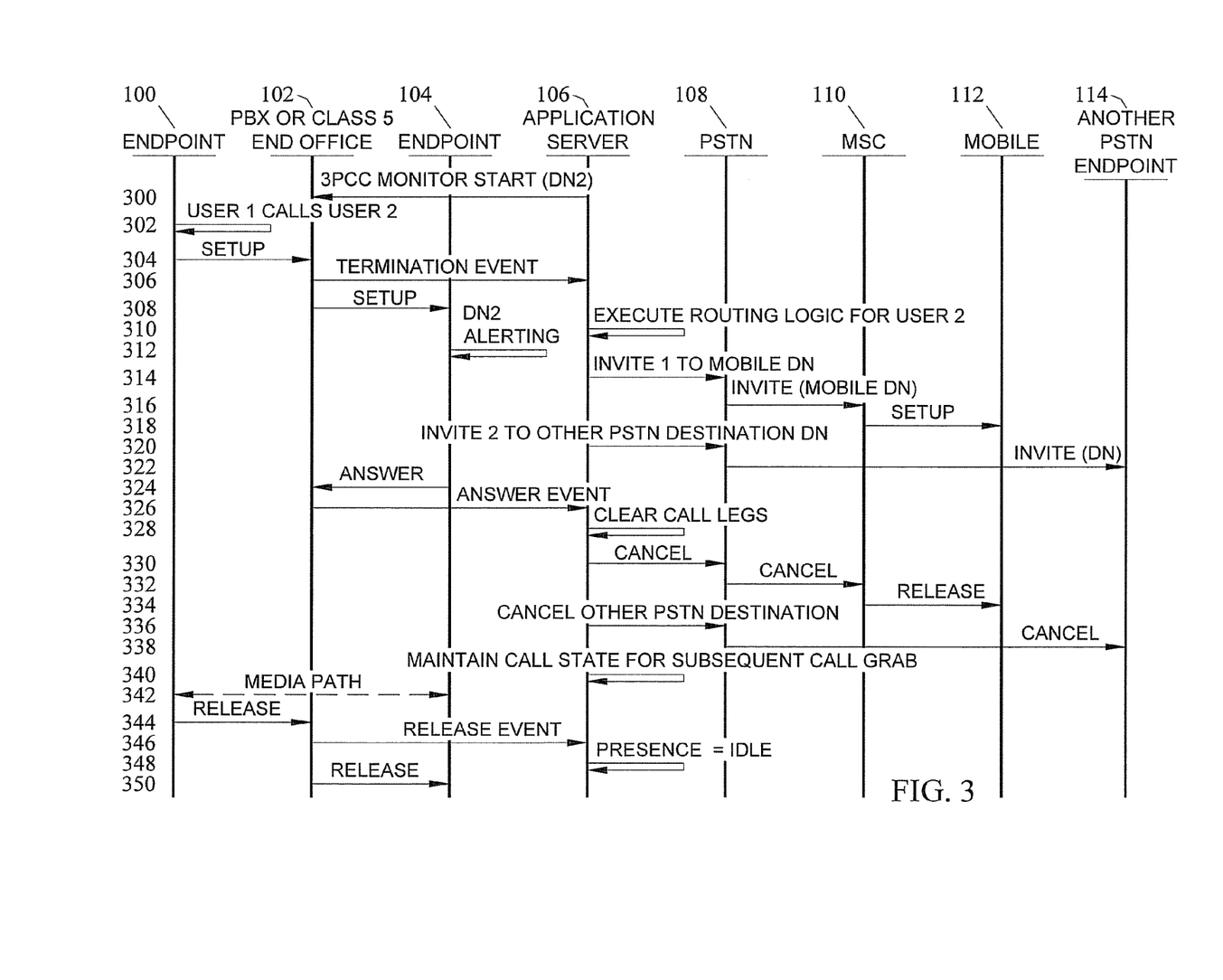
FIG. 3 is a message sequence diagram showing an exemplary process for unifying fixed and mobile devices via third party call control where the mobile device answers the session according to an embodiment of the subject matter described herein.

FIG. 3 is a message sequence diagram showing an exemplary process for terminating a session between unified fixed and mobile devices via third party call control according to an embodiment of the subject matter described herein. Referring to FIG. 3, at step 300, application server 106 may begin monitoring fixed endpoints connected to, served by, or otherwise associated with signaling node 102 via the 3PCC interface.

At step 302, fixed endpoint 100 makes a call to destination subscriber 126, as identified by his or her unified subscriber identifier.

At step 304, fixed endpoint 100 may send a call setup message to signaling node 102 that includes the unified subscriber identifier for subscriber 126.

At step 306, in response to receiving the Setup message, signaling node 102 may send a termination event message to application server 106 (which was requested by application server 106 in step 300).

At step 308, signaling node 102 may send a setup message to fixed endpoint 104 in an attempt to connect the call.

At step 310, routing logic for subscriber 126 may be executed on application server 106.

At step 312, fixed endpoint 104 may perform DN2 alerting. For example, the endpoint begins to ring in order to notify the user of the incoming call or session.

At step 314, application server 106 may send a first SIP INVITE message to PSTN 108 destined for a mobile DN associated with the unified subscriber identity.

At step 316, the first INVITE message may be forwarded from PSTN 108 to MSC 110 and ultimately, for delivery to the mobile subscriber. At step 318, application server 106 may initiate a session to one or more additional PSTN destinations, such as the user's home phone or some other device the user would also like the call to be offered to.

At step 320, application server 106 may send a second SIP INVITE message to PSTN 108 that is addressed to another PSTN node, such as PSTN node 114.

At step 322, the second INVITE message may be forwarded by PSTN 108 to other PSTN node 114.

In the scenario shown in FIG. 3, the called user chooses to answer the call using his or her fixed endpoint. Therefore, at step 324, fixed endpoint 104 may send an Answer message to signaling node 102 and, at step 326, signaling node 102 may return an Answer event message to application server 106.

At step 328, application server 106 may begin the process of clearing all other call legs, which are not needed because subscriber 126 has answered using fixed endpoint 104. For example, at step 330, application server 106 may send a first CANCEL message to PSTN 108 for canceling the call to mobile device 112. At step 332, the CANCEL message is forwarded by PSTN 108 to MSC 110 and, at step 334, MSC may formulate and deliver a Release message to mobile device 112. Additionally, application server 106 may send a second CANCEL message destined for PSTN node 114 for canceling the comfort noise, tone, or announcement services that are no longer needed. For example, at step 336, application server 106 may send the second CANCEL message to PSTN 108 which, at step 338, may forward the second CANCEL message to PSTN node 114.

At step 340, application server may optionally maintain call state information for subsequent call grabs.

Because subscriber 126 has answered the call using fixed endpoint 104, at step 342, a media path may be established between calling fixed endpoint 100 and called fixed endpoint 104. When the call is completed, subscriber 120 may hang up and begin the process of tearing down the call. For example, at step 344, fixed endpoint 100 may send a Release message to signaling node 102 and, at step 346, signaling node 102 may send a Release event message to application server 106. In response, at step 348, application server 106 may store an indication Presence=Idle. Finally, at step 350, signaling node 102 may send a Release message to fixed endpoint 104 and the call may be ended.

Figure 4:
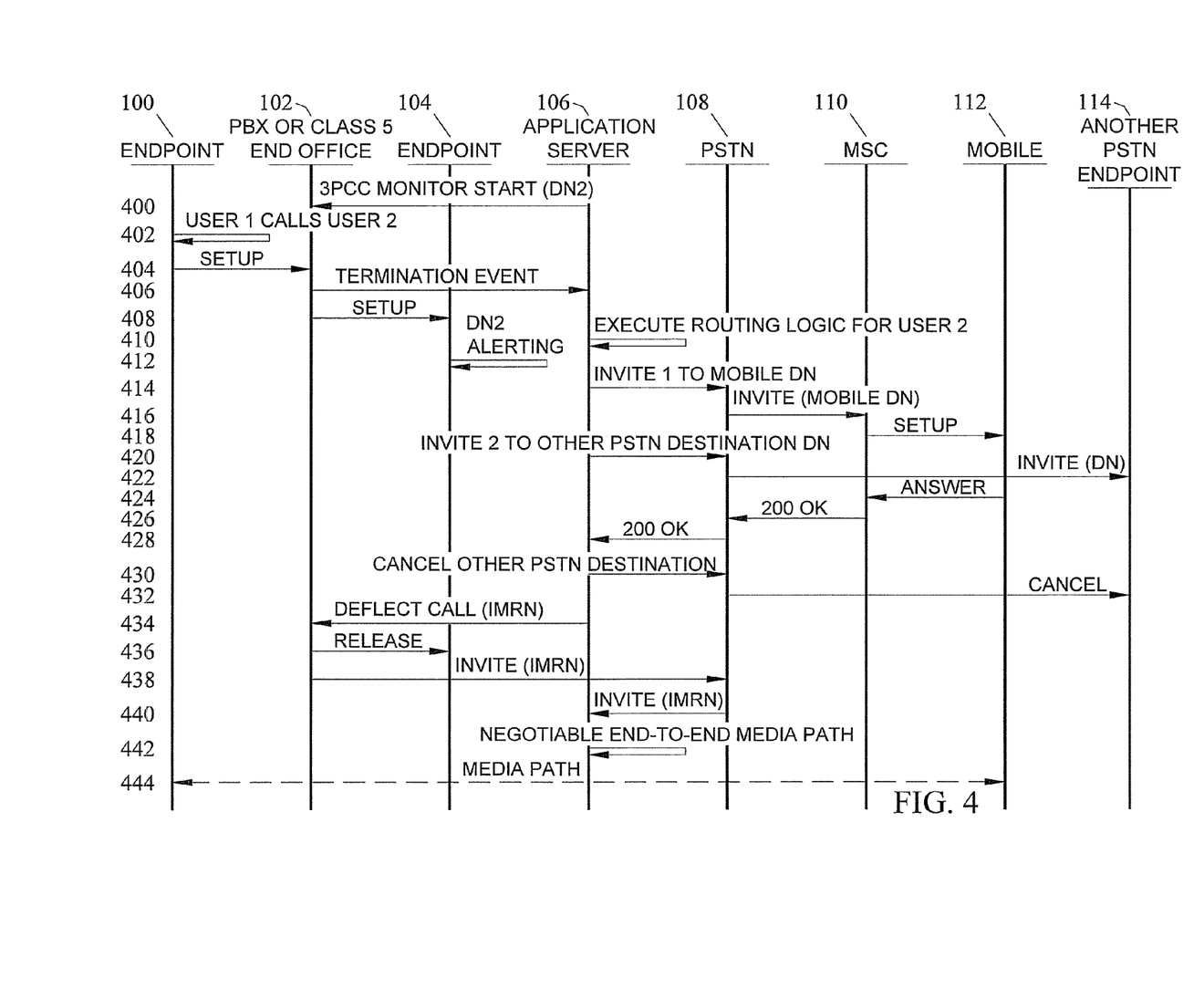
FIG. 4 is a message sequence diagram showing an exemplary process for unifying fixed and mobile devices via third party call control via third party call control where the fixed device answers the session according to an embodiment of the subject matter described herein.

FIG. 4 is a message sequence diagram showing an exemplary process for terminating a session between unified fixed and mobile devices via third party call control according to an embodiment of the subject matter described herein. Referring to FIG. 4, it may be appreciated that steps 400-420 are the same as steps 300-320 in FIG. 3. However, in contrast to the scenario illustrated in FIG. 3 where subscriber 120 answered the call using his or her fixed endpoint, in FIG. 4 subscriber 120 answers the call from his or her mobile device. For example, at step 400, application server 106 may begin monitoring fixed endpoints connected to, served by, or otherwise associated with signaling node 102 via the 3PCC interface.

At step 402, fixed endpoint 100 makes a call to destination subscriber 126, as identified by his or her unified subscriber identifier.

At step 404, fixed endpoint 100 may send a call setup message to signaling node 102 that includes the unified subscriber identifier for subscriber 126.

At step 406, in response to receiving the Setup message, signaling node 102 may send a termination event message to application server 106 (which was requested by application server 106 in step 400).

At step 408, signaling node 102 may send a setup message to fixed endpoint 104 in an attempt to connect the call.

At step 410, routing logic for subscriber 126 may be executed on application server 106.

At step 412, fixed endpoint 104 may perform DN2 alerting. For example, the endpoint begins to ring in order to notify the user of the incoming call or session.

At step 414, application server 106 may send a first SIP INVITE message to PSTN 108 destined for a mobile DN associated with the unified subscriber identity.

At step 416, the first INVITE message may be forwarded from PSTN 108 to MSC 110 and ultimately, for delivery to the mobile subscriber.

At step 418, MSC 110 may send a Setup message to mobile device 112.

At step 420, application server 106 may send a second SIP INVITE message to initiate a session to one or more additional PSTN destinations, such as the user's home phone or some other device the user would also like the call to be offered to. At step 422, the INVITE message is forwarded by PSTN 108 to PSTN node 114 for providing these services.

As mentioned above, in contrast to the scenario shown in FIG. 3, subscriber 126 may answer the call at his or her mobile device. Therefore, at step 424, mobile device 112 may send an Answer message to MSC 110.

At step 426, MSC 110 may send a 200 OK message to PSTN 108 and PSTN 108 may, at step 428, forward the 200 OK message to application server 106.

At step 430, application server 106 may cancel other call legs or landline-associated call signaling because they are no longer needed. For example, application server 106 may send a CANCEL message to PSTN 108 and, at step 432, PSTN 108 may forward the CANCEL message to PSTN node 114.

At step 434, application server 106 may deflect the call to mobile device 112 by sending a Deflect Call message including an International mobile routing number (IMRN) to PBX 102.

At step 436, signaling node 102 may send a Release message to fixed endpoint 104 and, at step 438, PBX 102 may redirect the call to the IMRN provided earlier. In a SIP embodiment, signaling node 102 may send a SIP INVITE message including the IMRN to PSTN 108. However, any suitable PBX protocol, such as primary rate interface (PRI), Q signaling (QSIG), and H.323 may also be used without departing from the scope of the subject matter described herein.

At step 440, PSTN 108 may forward the INVITE message to application server 106 and, at step 442, application server 106 may negotiate an end-to-end media path between fixed endpoint 100 and subscriber 126 at mobile device 112. Finally, at step 444, the media path has been established between the two endpoints and the call/session may be conducted (call/session teardown signaling messages omitted for simplicity).

Session Originating from a Unified Subscriber Identity

Figure 5:
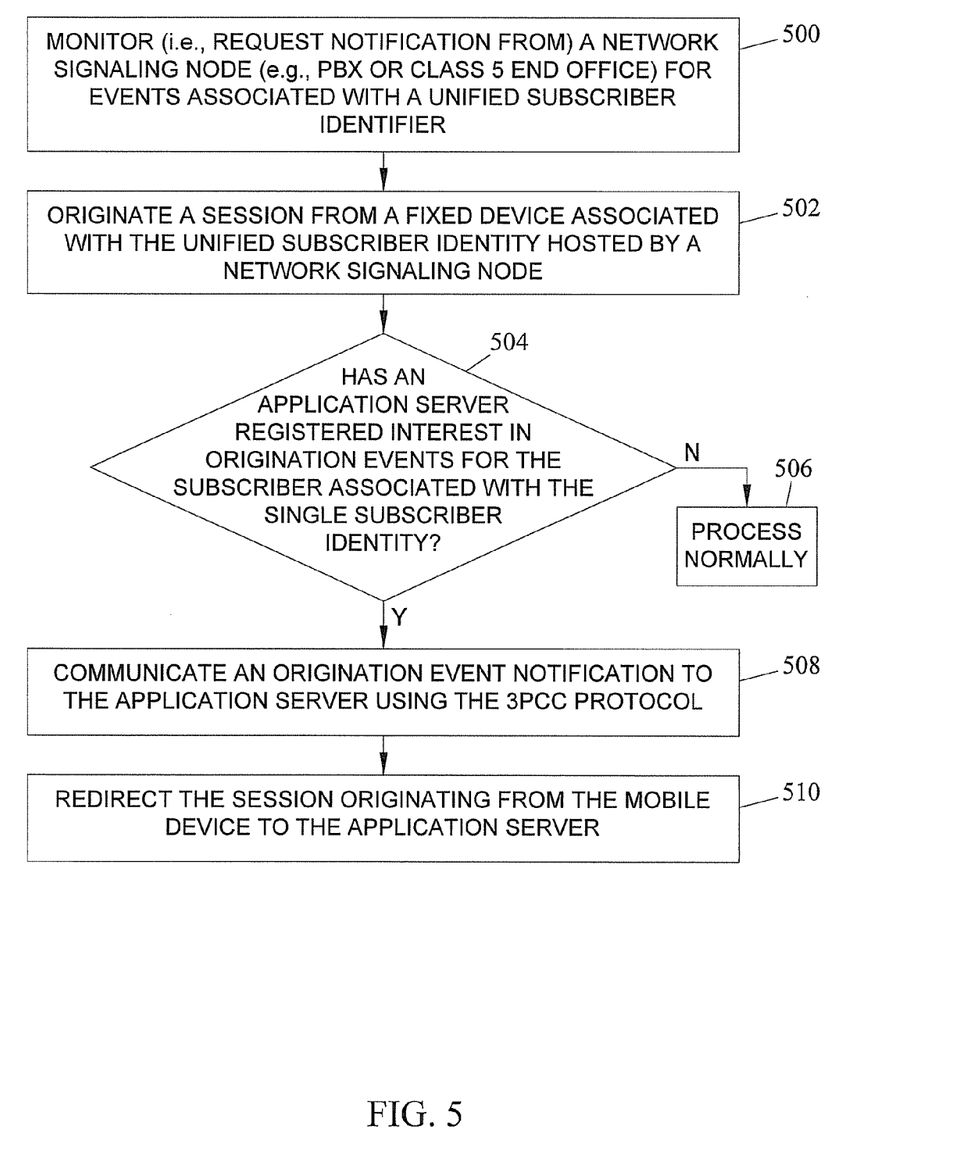
FIG. 5 is a flow chart showing an exemplary process for unifying fixed and mobile devices via third party call control for a session originating from a unified subscriber identity according to an embodiment of the subject matter described herein.

FIG. 5 is a flow chart showing an exemplary process for unifying fixed and mobile devices via third party call control for a session originating from a unified subscriber identity according to an embodiment of the subject matter described herein. Referring to FIG. 5, at step 500, a network signaling node may be monitored for events associated with a unified subscriber identifier. For example, an application server may request notification of (e.g., subscribe to) events such as reception of a SIP INVITE message associated with some subscriber identifiers served by a signaling node (e.g., a public branch exchange (PBX) or class 5 end office) but not other subscriber identifiers.

At step 502, a session may be originated from a fixed device associated with a unified subscriber identifier hosted by a network signaling node. The subscriber can originate a new session using any fixed or mobile device which shares the identity.

At step 504, it is determined whether an application server has registered interest in origination events for the subscriber associated with the unified subscriber identity.

If the session is not originated by a fixed device associated with a subscriber identifier for which an application server has registered interest in origination events, control may proceed to step 506 where the session may be processed normally. This may include routing the session to a destination mobile device.

However, if the session is not originated by a fixed device associated with a subscriber identifier for which an application server has registered interest in origination events, control may proceed to step 508. At step 508, an origination event notification may be communicated to the application server using the 3PCC protocol. For example, sessions originating from the fixed device may be processed by the node which hosts the fixed device using existing call setup routines. As a part of the origination, an origination event notification may be communicated using the 3PCC protocol to the application server. The application server may maintain this state information and represent it to other services running on the server (such as presence-based services).

At step 510, in response to receiving the origination event notification, the signaling node may redirect the session from the mobile device to the application server. Sessions originating from the mobile device may be redirected to the application server so that they can be processed using the single identity of the subscriber. It may be appreciated that, by redirecting sessions to the application server, the terminating party is not aware of the specific device which the subscriber uses to create the call. Several methods exist for redirecting a call to an application server. These include leveraging a software application (client) running on the mobile device to redirect the call, using an intelligent network (IN)-based service node to redirect the origination to the application server, or using translations and routing services defined natively within the wireless carrier's network to route the call.

Call Grabbing

Once the subscriber has an active session on one device, the subscriber may move or "grab" the call to a different device by leveraging a call grabber service. Call grabber service may be provided by SIP application server(s) and work between clients registered on the server. The call grabber service can be leveraged when the fixed endpoint is hosted by other telephony nodes, such as a PBX, a softswitch, or an end-office telephony node.

Figure 6:
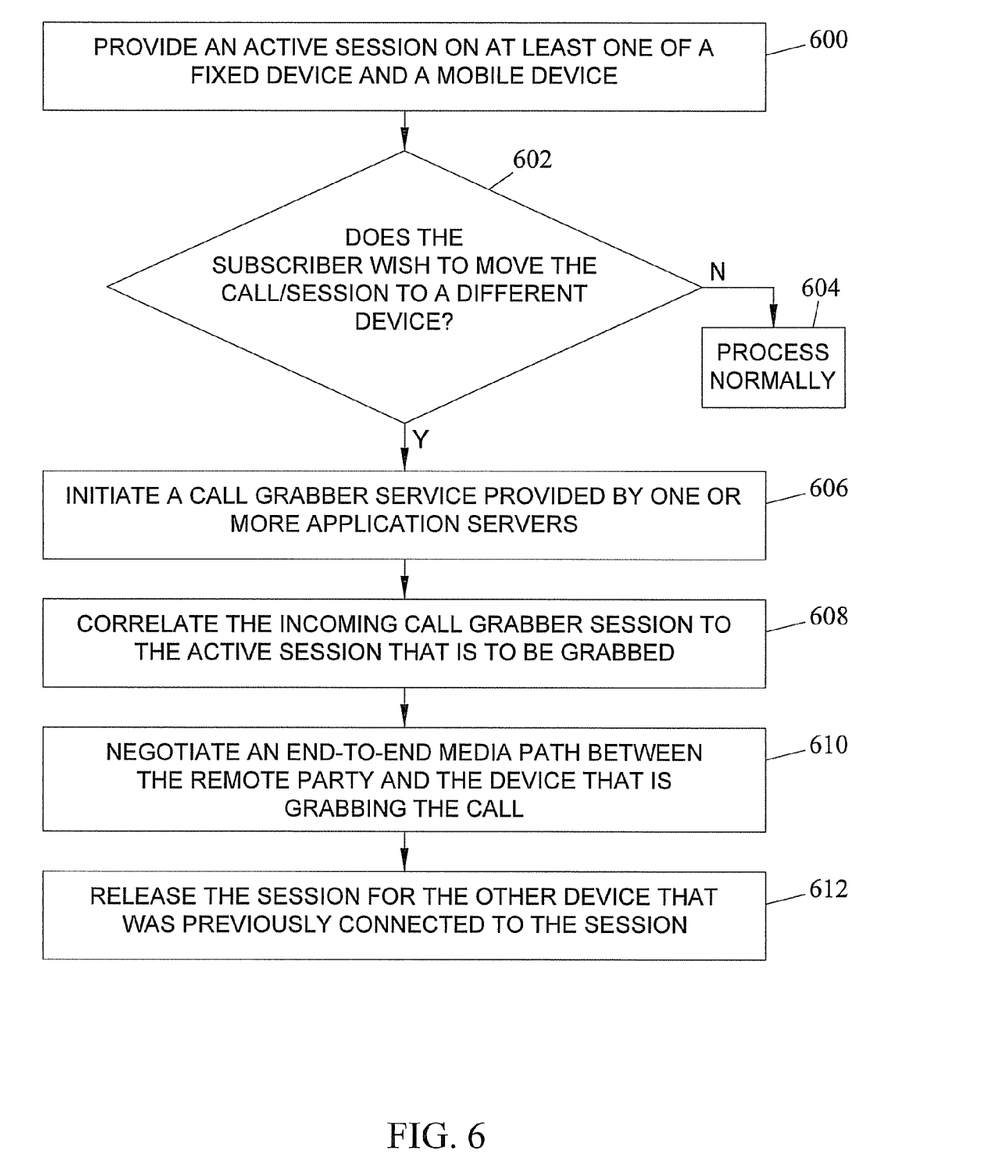
FIG. 6 is a flow chart showing an exemplary process for grabbing a call/session by a fixed endpoint from a mobile device according to an embodiment of the subject matter described herein.

FIG. 6 is a flow chart showing an exemplary process for grabbing a call/session by a fixed endpoint from a mobile device according to an embodiment of the subject matter described herein. Referring to FIG. 6, at step 600, an active session is provided on at least one of a fixed device and a mobile device. It may be appreciated that as a precondition to performing a call grab, an active session exists and the application server has received state notifications of the session via the 3PCC interface.

At step 602, it may be determined whether the subscriber desires to move the call or session to a different device than the one currently used for conducting the call. If it is determined that the subscriber does not wish to move the call to another device, then control may proceed to step 604 where the call may proceed normally using the existing device.

However, if the subscriber wishes to move the call to another device, which may be associated with the current device via the unified subscriber identity, control may proceed to step 606. At step 606, a call grabber service that is provided by one or more application servers may be initiated. In one potential embodiment, the call grabber service may be initiated by entering a service code on the device to which the call is to be moved (grabbed). If the call grabber service code is entered on the fixed device, a notification may be sent via the 3PCC interface to the application server to inform it of the service request. The application server may then allocate a TLDN and direct the fixed device's node (via a 3PCC response) to deflect the session to the specified TLDN. The fixed device's node may respond by redirecting the call to the TLDN, which ultimately routes to the application server.

Alternatively, if the call grabber service code is entered on the mobile device, call redirection may be handled using the method outlined above for originating sessions from a single identity. Through this method, the call is ultimately routed to the application server.

At step 608, when application server 106 receives the incoming call grabber session, it may correlates the incoming call grabber session to the active session that is to be grabbed. When invoked from a fixed device, the TLDN may be correlated to the state information stored with the initial 3PCC notification. This identifies the subscriber, which the application server can use to locate the active session. Alternatively, when invoked from a mobile device, the calling line identification (CLI) may identify the mobile DN, which can be correlated to the endpoint's active session. Application server 106 may use the mobile DN to locate the active session. Application server 106 may allocate a TLDN and leverage the 3PCC interface to instruct the node associated with the fixed device identified by the DN to perform a single-step transfer to the TLDN. The fixed device's node may respond by performing the transfer and result in the application server having direct control of the initial call.

At step 610, the application server may then negotiate an end-to-end media path between the remote party and the device that is grabbing the call.

At step 612, the subscriber's other device, which was previously connected to the session, may be released. It may also be appreciated that a call may be grabbed multiple times between fixed and mobile devices by repeating the method described above.

Figure 7:
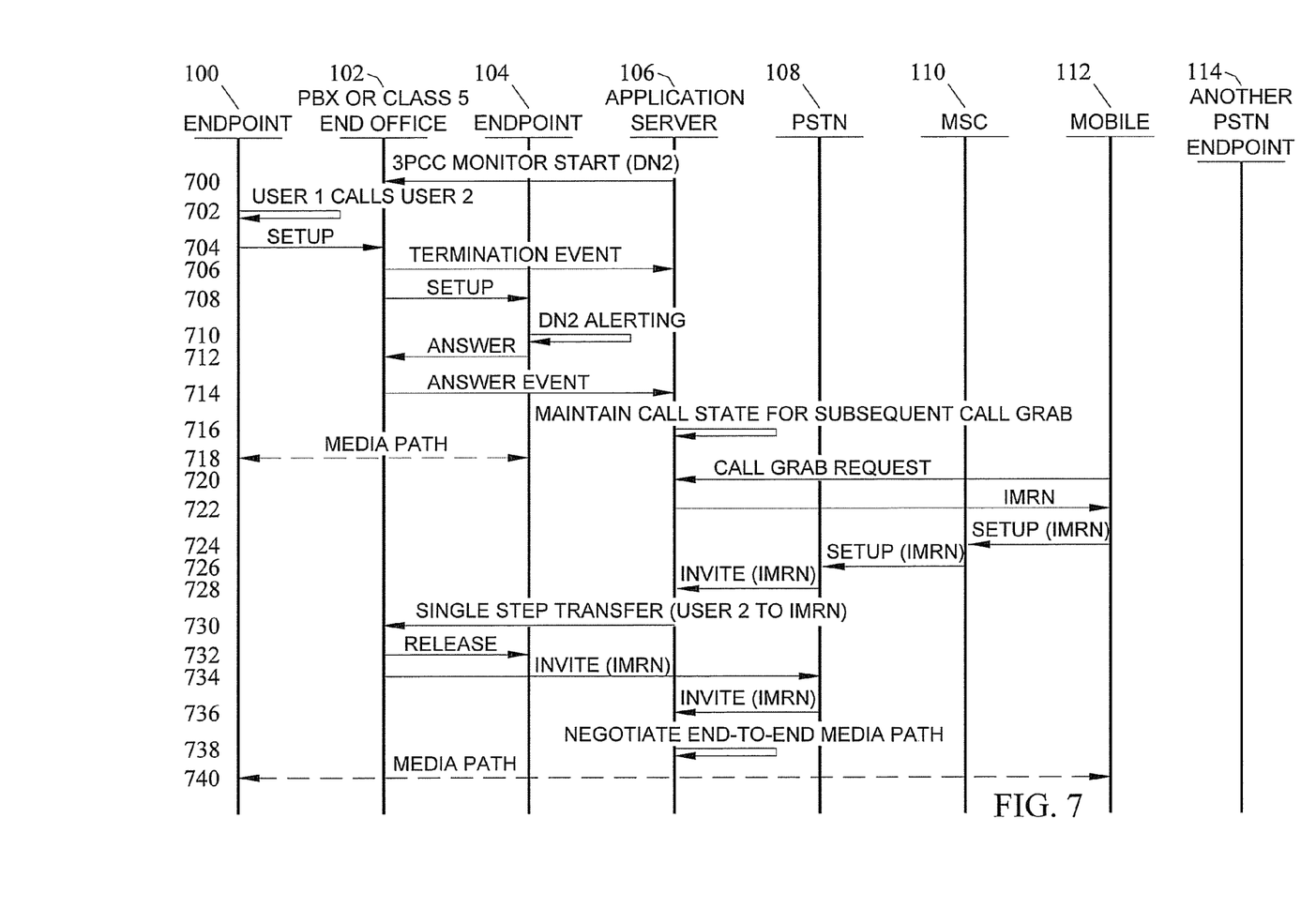
FIG. 7 is a message sequence diagram showing an exemplary process for a mobile device grabbing a call/session from a fixed endpoint according to an embodiment of the subject matter described herein.

FIG. 7 is a message sequence diagram showing an exemplary process for a mobile device grabbing a call/session from a fixed endpoint according to an embodiment of the subject matter described herein. Referring to FIG. 7, at step 700, application server 106 may begin monitoring fixed endpoints connected to, served by, or otherwise associated with signaling node 102 via the 3PCC interface.

At step 702, fixed endpoint 100 makes a call to destination subscriber 126, as identified by his or her unified subscriber identifier.

At step 704, fixed endpoint 100 may send a call setup message to signaling node 102 that includes the unified subscriber identifier for subscriber 126.

At step 706, in response to receiving the Setup message, signaling node 102 may send a termination event message to application server 106 (which was requested by application server 106 in step 700).

At step 708, signaling node 102 may send a setup message to fixed endpoint 104 in an attempt to connect the call.

At step 710, fixed endpoint 104 may perform DN2 alerting. For example, the endpoint may begin to ring in order to notify the user of the incoming call/session.

At step 712, fixed endpoint 104 may send an Answer message to PBX 102.

At step 714, signaling node 102 may send an Answer event message to application server 106.

At step 716, application server 106 may maintain call state information for a subsequent call grab.

At step 718, a media path may be established between fixed endpoint 100 and fixed endpoint 104.

At step 720, a call grab request may be received (from subscriber 126) originating from mobile device 112.

At step 722, application server 106 may send an IP multimedia routing number (IMRN) to mobile device 112 in response to the call grab request. The IMRN is a routable number that points to IMS and has the same structure as an international ISDN number. When a call is originated by a user equipment (UE) device in a circuit switched network (e.g., PSTN 108), appropriate call information associated with the call may be provided to a CCCF network node disposed in the IMS network. At the CCCF node, a pool of E.164 numbers may be maintained as IMRNs which are mapped to, or otherwise associated with, called party numbers. In addition to the IMS-based embodiment shown, it is appreciated that the subject matter described herein may also be applied to pre-IMS networks and that the IMS routing scenario illustrated in FIG. 7 is not intended to be limiting.

At step 724, mobile device 112 may send a call Setup message that includes the IMRN to MSC 110.

At step 726, MSC 110 may forward the Setup message including the IMRN to PSTN 108 and, at step 728, PSTN 108 may formulate and send a SIP INVITE message including the IMRN to application server 106.

At step 728, application server 106 may send a Single Step Transfer message, for transferring subscriber 126 to the IMRN, to PBX 102. It is appreciated that while an IMRN (or similar mechanism) may be used both for routing call between MSC 110 and application server 106, as well as between application server 106 and PBX 102, this does not necessarily mean that the IMRN has to be the same in both cases. Steps 726 and 728 may be independent of one another.

In response, at step 730, signaling node 102 may send a Release message to fixed endpoint 104.

Additionally, at step 732, signaling node 102 may send an INVITE message including the IMRN to PSTN 108.

At step 734, PSTN 108 may forward the INVITE message including the IMRN to application server 106.

At steps 736 and 738, application server 106 may negotiate an end-to-end media path between fixed endpoint 100 and (subscriber 126 at) mobile device 112.

Figure 8:
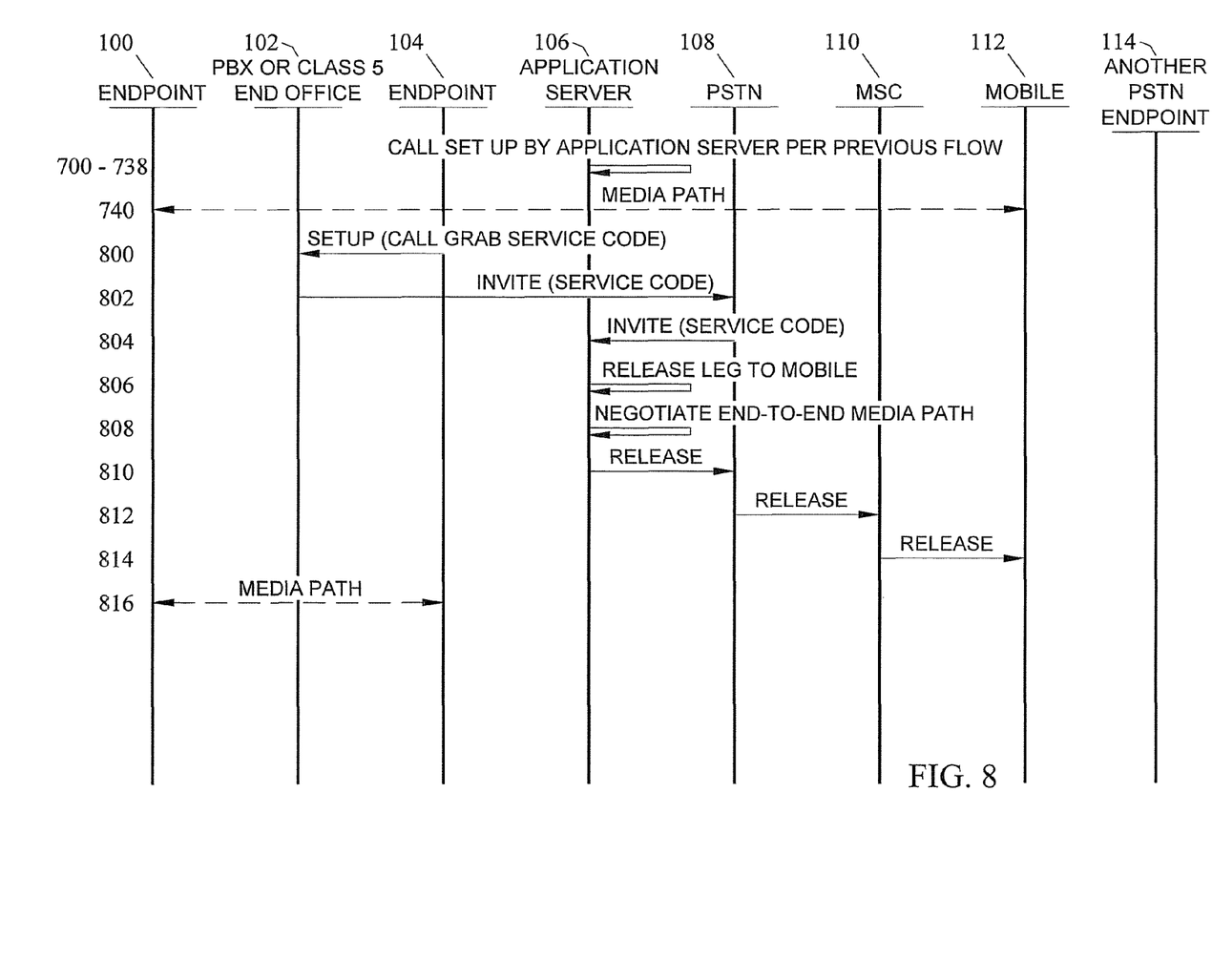
FIG. 8 is a message sequence diagram showing an exemplary process for a fixed endpoint grabbing a call/session from a mobile device according to an embodiment of the subject matter described herein.

FIG. 8 is a message sequence diagram showing an exemplary process for a fixed endpoint grabbing a call/session from a mobile device according to an embodiment of the subject matter described herein. Referring to FIG. 8, at step 800, fixed endpoint 104 may send a Setup message to signaling node 102 that includes a Call grab service code.

At step 802, signaling node 102 may send an INVITE message, including the call grab service code, to PSTN 108 and, at step 804, PSTN 108 may forward the INVITE message to application server 106.

At step 806, application server 106 may begin the process of releasing the call leg to the mobile device.

At step 808, application server 106 may begin the process of negotiating an end-to-end media path.

The call leg release process referenced in step 806 may begin, at step 810, when application server 106 sends a Release message to PSTN 108.

At step 812, PSTN 108 may forward the Release message to MSC 110 and, at step 814, MSC 110 may forward the Release message to mobile device 112.

The media path negotiation process referenced in step 808 may result in, at step 816, a media path being established between fixed endpoint 100 and fixed endpoint 104 (because subscriber 126 grabbed the call using their fixed endpoint 104 in this scenario).

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method performed by an application server (AS) that supports a third-party call control (3PCC) interface for unifying fixed and mobile devices via third party call control, the method comprising:

detecting a call from an originating endpoint, wherein the call is addressed to a unified subscriber identifier associated with a terminating subscriber, wherein the terminating subscriber is associated with two or more terminating endpoints;

offering the call to each of the terminating endpoints by initiating signaling to each of the terminating endpoints using the 3PCC interface;

detecting a first one of the terminating endpoints used to answer the call;

redirecting the call to the first terminating endpoint used to answer the call;

sending signaling messages to all remaining ones of the terminating endpoints other than the first terminating endpoint for instructing the remaining terminating endpoints to release resources associated with the call;

receiving an indication that the terminating subscriber wishes to terminate the call at a second terminating endpoint that is different from the first terminating endpoint, wherein receiving the indication includes receiving a service code from the second terminating endpoint, the service code identifying a call grabber service as part of a setup message;
initiating the call grabber service for invoking a call grabber session;
correlating the call grabber session to the call;
negotiating an end-to-end media path between the originating endpoint and the second terminating endpoint;
connecting the call between the originating endpoint and the second terminating endpoint; and
sending signaling messages to the first terminating endpoint for instructing the first terminating endpoint to release resources associated with the call.

2. The method of claim 1, wherein offering the call to the two or more terminating endpoints includes offering the call to at least one of a mobile endpoint and a fixed endpoint.

3. The method of claim 1, further comprising paging and alerting at least one of the terminating endpoints.

4. The method of claim 1, further comprising maintaining state information for a session associated with the call such that the state information is visible to services running on the application server.

5. The method of claim 1, further comprising allocating a temporary location directory number (TLDN) to a call grabber session and instructing a signaling node to transfer the call grabber session to the specified TLDN.

6. The method of claim 1, further comprising registering interest in termination or origination events by an endpoint associated with the unified subscriber identifier that includes requesting notification of events whenever a session originates or terminates to the endpoint associated with the unified subscriber identifier.

7. An application server (AS) configured to support a third-party call control (3PCC) interface, the AS comprising:
a processor; and
a memory coupled to the processor, the memory having program instructions stored thereon that, upon execution by the AS, cause the AS to:
detect a call from an originating endpoint, wherein the call is addressed to a unified subscriber identifier associated with a terminating subscriber, wherein the terminating subscriber is associated with two or more terminating endpoints;
offer the call to each of the terminating endpoints by initiating signaling to each of the terminating endpoints using the 3PCC interface;
detect a first one of the terminating endpoints used to answer the call;
redirect the call to the first terminating endpoint used to answer the call;
send signaling messages to all remaining ones of the terminating endpoints other than the first terminating endpoint for instructing the remaining terminating endpoints to release resources associated with the call;
receive an indication that the terminating subscriber wishes to terminate the call at a second terminating endpoint that is different from the first terminating endpoint, wherein the indication includes a service code identifying a call grabber service as part of a setup message;
initiate the call grabber service for invoking a call grabber session;
correlate the call grabber session to the call;
negotiate an end-to-end media path between the originating endpoint and the second terminating endpoint;
connect the call between the originating endpoint and the second terminating endpoint; and
send signaling messages to the first terminating endpoint for instructing the first terminating endpoint to release resources associated with the call.

8. The AS of claim 7, wherein the AS is configured to communicate with one of a private branch exchange (PBX), a softswitch, or an end-office telephony node.

9. The AS of claim 7, wherein the 3PCC interface includes one of a technical report (TR)-87 interface or a telephony application programming interface (TAPI)-based interface.

10. The AS of claim 7, wherein the AS provides uniform services for the unified subscriber identifier.

11. The AS of claim 7, wherein the unified subscriber identifier includes one of a directory number (DN) or a uniform resource identifier (URI).

12. The AS of claim 7, wherein the 3PCC interface is configured to register interest in termination or origination events by an endpoint associated with the unified subscriber identifier that includes requesting notification of events whenever a session originates or terminates to the endpoint associated with the unified subscriber identifier.

13. A computer readable medium comprising computer executable instructions embodied in a non-transitory computer readable medium that, upon execution by an application server (AS) that supports a third-party call control (3PCC) interface, cause the AS to:
detect a call from an originating endpoint, wherein the call is addressed to a unified subscriber identifier associated with a terminating subscriber, wherein the terminating subscriber is associated with two or more terminating endpoints;
offer the call to each of the terminating endpoints by initiating signaling to each of the terminating endpoints using the 3PCC interface;
detect a first one of the terminating endpoints used to answer the call;
redirect the call to the first terminating endpoint used to answer the call, wherein the first terminating endpoint is a mobile endpoint;
send signaling messages to all remaining ones of the terminating endpoints other than the first terminating endpoint for instructing the remaining terminating endpoints to release resources associated with the call;
receive an indication that the terminating subscriber wishes to terminate the call at a second terminating endpoint that is different from the first terminating endpoint, wherein the second terminating endpoint is a fixed endpoint and wherein the indication includes a service code identifying a call grabber service;
initiate the call grabber service for invoking a call grabber session;
correlate the call grabber session to the call;
negotiate an end-to-end media path between the originating endpoint and the second terminating endpoint;
connect the call between the originating endpoint and the second terminating endpoint; and
send signaling messages to the first terminating endpoint for instructing the first terminating endpoint to release resources associated with the call.

* * * * *